(12) United States Patent
Weissbrod

(10) Patent No.: US 6,637,593 B2
(45) Date of Patent: Oct. 28, 2003

(54) LACED ELECTRODE COIL AND METHOD OF MAKING

(75) Inventor: Paul A. Weissbrod, South Euclid, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 21 days.

(21) Appl. No.: 09/900,354

(22) Filed: Jul. 9, 2001

(65) Prior Publication Data

US 2003/0006873 A1 Jan. 9, 2003

(51) Int. Cl.[7] ............................................... B65D 85/04
(52) U.S. Cl. ..................... 206/397; 206/389; 242/160.1
(58) Field of Search ........................ 206/389, 395–397, 206/400–402, 410, 411, 415; 242/125.1, 159, 160.1–160.4, 164, 165

(56) References Cited

U.S. PATENT DOCUMENTS

| 2,772,773 | A | * | 12/1956 | Pestell ........................ 206/410 |
| 3,440,979 | A | | 4/1969 | Frederick |
| 3,685,470 | A | | 8/1972 | Frederick |
| 3,824,940 | A | | 7/1974 | Habegger et al. |
| 3,862,493 | A | | 1/1975 | Habegger et al. |
| 4,513,864 | A | * | 4/1985 | Liebel ........................ 206/415 |
| 4,851,074 | A | * | 7/1989 | Uchida ........................ 156/541 |
| 6,155,421 | A | * | 12/2000 | Cooper ........................ 206/400 |
| 2002/0088070 | A1 | * | 7/2002 | Cho ........................ 15/104.002 |

* cited by examiner

*Primary Examiner*—Jim Foster
(74) *Attorney, Agent, or Firm*—Fay, Sharpe, Fagan, Minnich & McKee

(57) ABSTRACT

A welding electrode wire coil and a method of making the same comprises embedding the inner end of the electrode wire between adhesively bonded convolutions of a wound core made of paper to secure the wire end thereto. The coil is completed by winding the wire about the core and then lacing a cord about the core and the coiled wire thereon in a diamond stitch lacing pattern to retain the coiled wire on the core prior to use. The lacing is provided with a slip knot to facilitate its release relative to the coiled wire and core.

11 Claims, 11 Drawing Sheets

LACED ELECTRODE COIL AND METHOD OF MAKING

FIELD OF THE INVENTION

The invention is in the field of electrode coil manufacture and storage. Electrode wire is wound around a reel and then dispensed from an adapter where it is used in a welding process.

BACKGROUND OF THE INVENTION

Electrode wire used in welding processes is wound and stored on cardboard cores. The inner end of the wire is stapled or taped to the interior portion of the core and is wrapped around the core. Wrapping of the electrode wire or coil continues until the wire terminates in an outer end. The coil is then secured with metal ties which extend through the core and then upwardly and inwardly across the outer turns of wire. The coil and the core are secured by twisting or braiding the free ends of the ties to fix them in place. Typically there are three to five ties circumferentially and equally spaced from each other. Therefore, to use the electrode coil all of the metal ties must be unbraided or cut and removed. It is difficult to unbraid or cut and remove the ties once the electrode coil and core have been placed on a supporting reel for dispensing to the welding process because the reel interferes with the removal of the ties. Furthermore, application of the ties is a manual task which cannot be economically automated, whereby the application is time consuming and expensive, and often twisting of the ties results in breakage thereof which adds to the time required to complete the application.

INCORPORATION BY REFERENCE

U.S. Pat. No. 3,685,470 to Frederick discloses a lacing machine for stator coils having a table upon which a horizontal shaft is mounted for rotation. A stator support on the top of the platform is driven in increments of advancement, or indexed, for binding of the coil. The disclosure of U.S. Pat. No. 3,685,470 to Frederick is incorporated herein by reference for background information with regard to lacing procedures and apparatus.

U.S. Pat. No. 3,440,979 to Frederick discloses a machine for lacing the coils of wound stators with a needle and supporting bar which is advanced and retracted, tilted upwardly and downwardly and rotated on its axis. The disclosure of U.S. Pat. No. 3,440,979 to Frederick is also incorporated herein by reference for background information regarding lacing procedures and apparatus.

U.S. Pat. Nos. 3,824,940 and 3,862,493 to Habegger, et al. disclose an apparatus and method for lacing or tying cord about end turn portions of coils that project beyond faces of dynamo electric machine magnetic cores. The disclosures of U.S. Pat. Nos. 3,824,940 and 3,862,493 to Habegger, et al. are incorporated herein by reference for background information regarding lacing procedures and apparatus.

SUMMARY OF THE INVENTION

It is highly desirable to have an electrode coil which is securely bound and restrained and which is readily available for use and does not require considerable preparation time prior to use.

In accordance with one aspect of the invention, a coil core is preferably made of kraft paper which includes a first side and a second side. Adhesive is provided on the first side of the paper and the paper is wound upon itself in successive plies with the adhesive coated side facing outward. An electrode wire has an inner and an outer end and is wound around the core. The inner end of the electrode wire is embedded between plies of the kraft paper. The electrode wire is wound about the core and terminates in an outer end. Preferably, at least one turn of the electrode wire at the inner end thereof is embedded between plies of the kraft paper. The kraft paper is formed around a mandrel and, preferably, at least two layers of the kraft paper are wound on the mandrel before the innermost end of the wire is laid thereupon. Preferably, two to four additional wraps of the core paper are then wound about the mandrel together with the wire to securely retain the inner end of the electrode wire on the core. The adhesive on the outside of the core paper engages the innermost end portion of the wire as well as the embedded turns thereof.

In accordance with another aspect of the invention, cord is laced in a pattern around the electrode coil and core, preferably in a generally diamond-shaped lacing pattern which provides strength for retaining the coiled wire about the periphery of the coil. The diamond-shaped lacing is circumferentially spaced about the coil periphery and, preferably, the lacing structure includes up to 24 generally diamond-shaped structures. The cord may be any flexible material having high tensile strength and good abrasion characteristics such as nylon, for example. Preferably, a slip knot ties the beginning end and the ending end of the cord together. Accordingly, in use an operator mounts the coil of wire on a dispensing reel and one pull of the slip knot releases the diamond structure of the laced cord in sequence from the coil around its entire periphery. One significant advantage of this aspect of the present invention is that the operator no longer has to perform the time consuming task of unbraiding or cutting the metal ties, thus enhancing efficiency and ease with respect to use of the electrode coil. Another advantage is that the use of lacing machines to secure the electrode coil about the core allows automation of the coil binding process, yielding labor savings and related manufacturing economies.

It is an object of the present invention to provide a core for an electrode wire coil comprised of an adhesively coated paper wound with the adhesive coating facing outwardly.

A further object is the provision of a coil core of the foregoing character comprised of multiple layer adhesively coated paper.

Another object of the invention is to provide an electrode wire coil having an inner end of the wire embedded in the layers of the core of adhesive coated paper.

Yet a further object of the invention is to provide an electrode coil with a cord stitched around the coil and core, preferably in a generally diamond-shaped lacing pattern, to releasably hold the coiled wire about the periphery of the core.

Still another object is the provision of lacing of the foregoing character having ends connected in a quick-release knot to facilitate removal of the lacing from the coil.

A further understanding of the invention will be had when reference is made to the Brief Description of the Drawings, the detailed Description of the Invention, and claims which follow hereinbelow.

DESCRIPTION OF THE INVENTION

Figure 1:
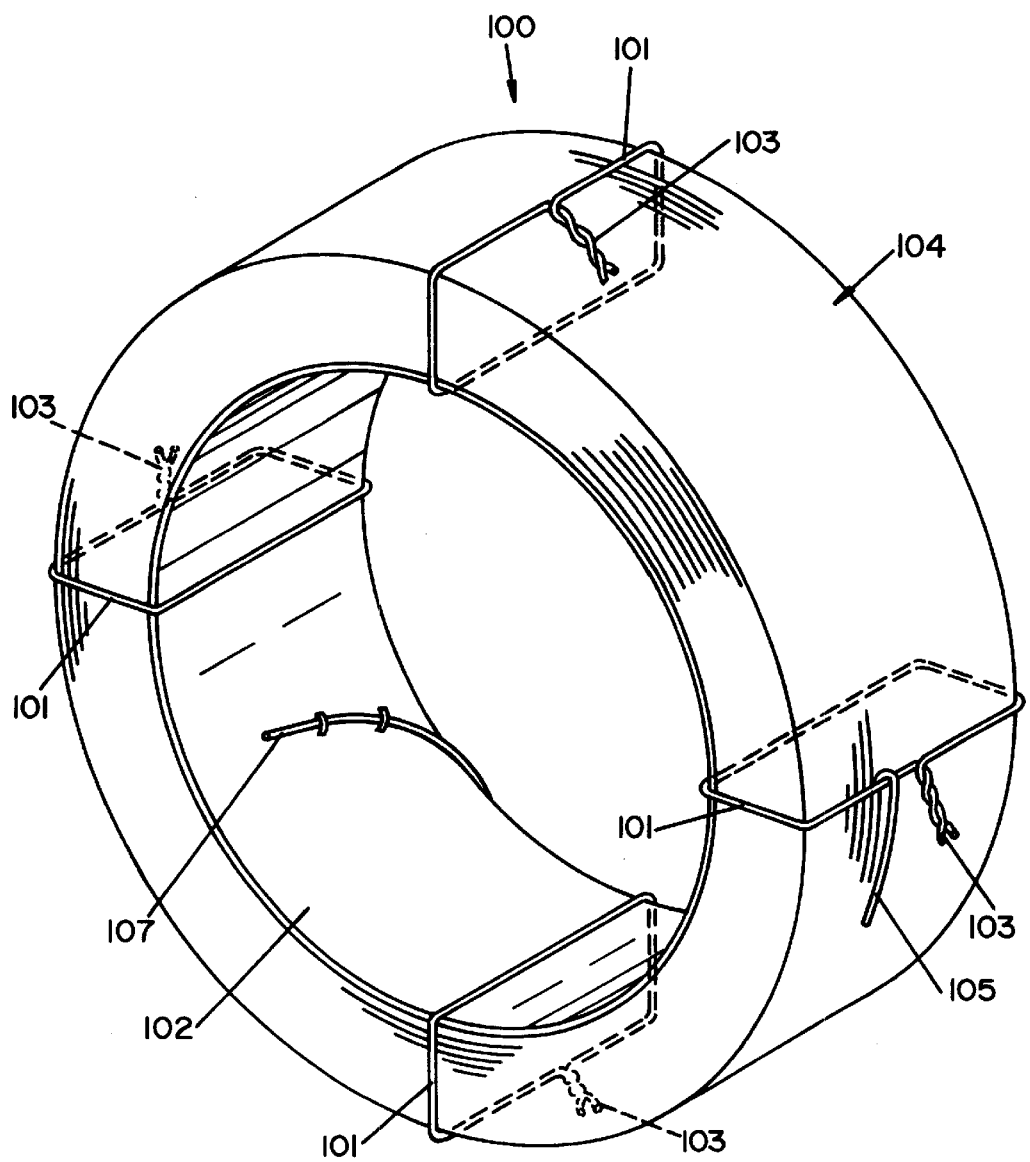
FIG. 1 is a perspective view of a prior art coil illustrating the use of metal tie wraps.

FIG. 1 is a perspective view of a prior art welding wire coil 100 illustrating the use of wire tie wraps 101 to retain the coiled wire 104 on the core. The electrode wire is wound about a core 102. Core 102 is of a cardboard or chip board material stapled or notched together, and the electrode wire extends from the interior of the core 102 around an edge thereof and is wound circumferentially about the outer side of the core. Inner end 107 of the wire is stapled to the interior of the core 102, and the electrode wire terminates in an outer end, as signified by reference numeral 105, which is bent back over tie 101 for packaging. Ties 101 extend through core 102 and thence upwardly and inwardly about the coiled wire, and the free ends of the ties are twisted or braided together as indicated by numeral 103 to retain the coiled wire on core 102.

Figure 2:
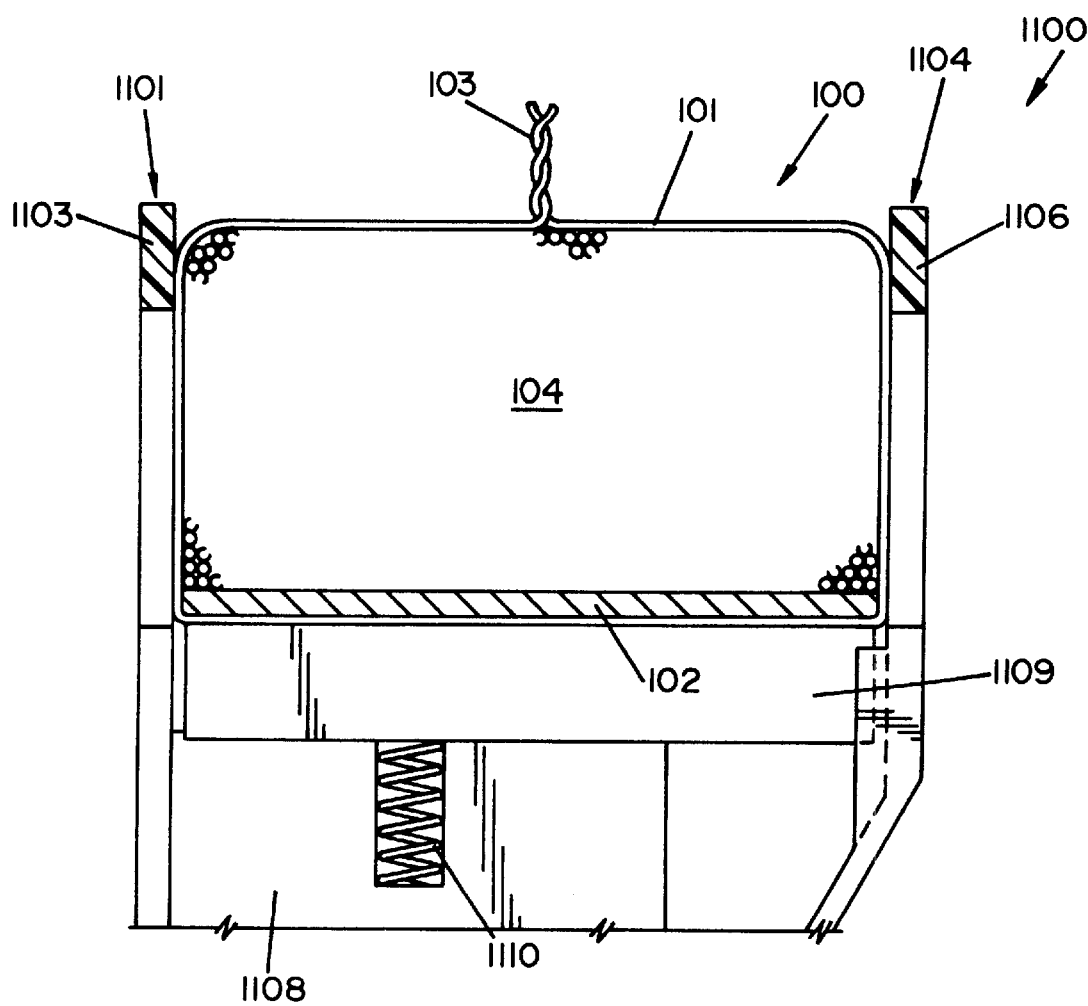
FIG. 2 is a cross-sectional view of a prior art coil illustrating the wrapped coil on a supporting reel.
Figure 11:
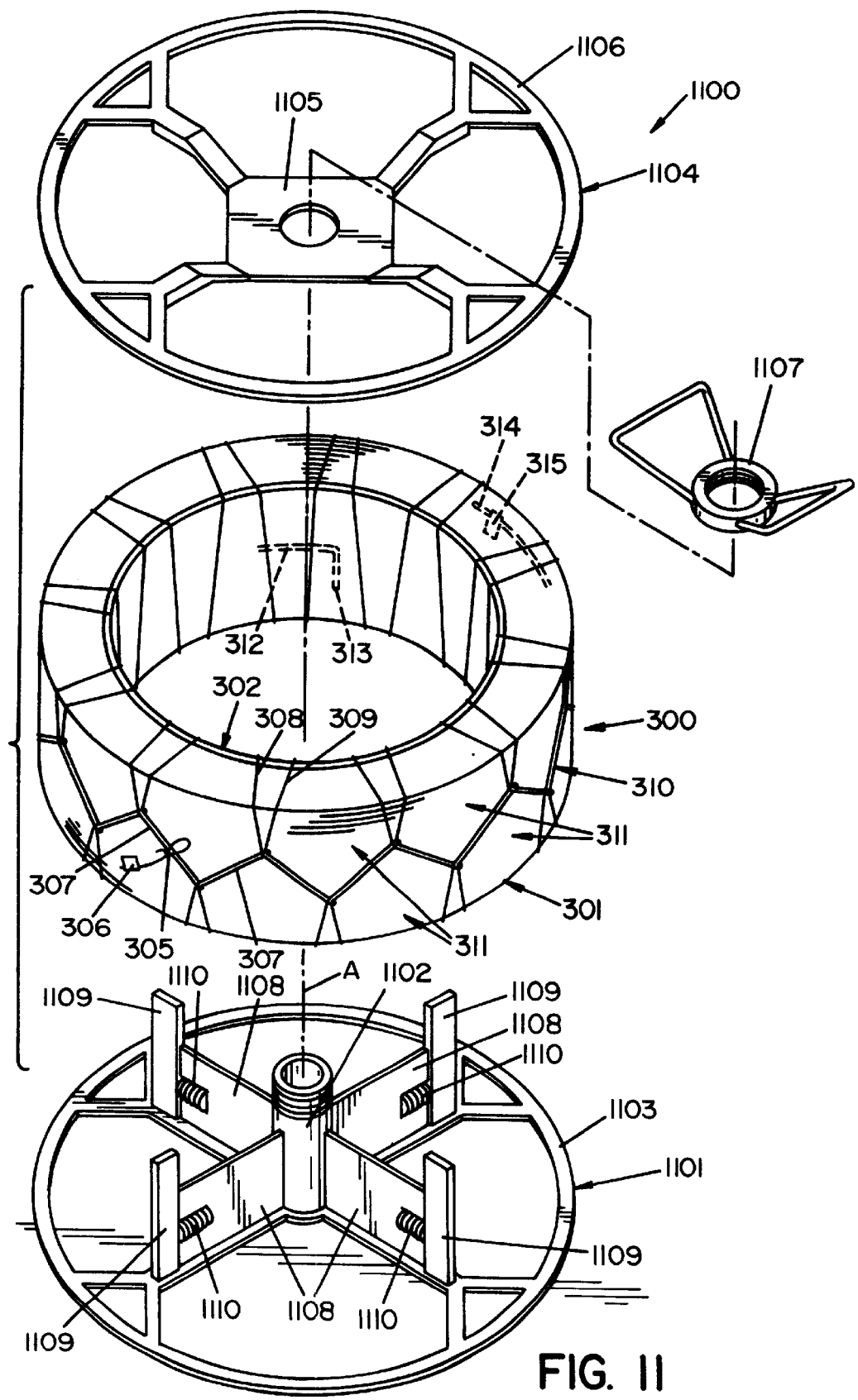
FIG. 11 is an exploded view of the laced electrode coil and portions of a dispenser.

FIG. 2 is a cross-sectional view of the prior art coil 100 mounted on a dispensing reel 1100, the structure of which is best illustrated in FIG. 11. With reference to the latter figure, numeral 1101 generally designates a first component of the dispenser having a hub 1102 providing a reel axis A and a flange portion 1103 transverse to axis A. Reference numeral 1104 identifies a second component of the reel having an apertured central plate 105 for receiving hub 1102 and a flange portion 1106. Wing nut 1107 secures the reel components 1101 and 1104 together. Reel component 1101 includes plates 1108 extending radially outwardly from hub 1102 and an axially extending clamping plate 1109 at the outer end of each plate 1108 and biased radially outwardly thereof by a corresponding spring 1110. When a welding wire coil is mounted on reel 1100, plates 1109 engage against the core of the coil to prevent slippage between the coil and reel. When prior art coil 100 is mounted on reel 1100, as shown in FIG. 2, it is difficult to cut the tie wrap 101 and remove the tie because there is interference between the axially outer ends of the ties and the reel flanges 1103 and 1106 which deters removal of the wire ties from the coiled wire and core.

FIGS. 3–8 illustrate an electrode wire coil 300 according to the present invention and wherein the coiled wire 301 is wound on a core 302 to be described hereinafter and is retained on the core by lacing 310 which is in a diamond stitch lacing pattern about the electrode coil. More particularly, a plurality of chain-like double cord loops 307 extend circumferentially about the coiled wire, forming a portion of the generally diamond stitch lacing pattern which is completed by single cord stitch segments 308 and 309 which extend axially outwardly, radially inwardly and then axially through core 302 between circumferentially adjacent ones of the double cord loops 307. The diamond stitch lacing pattern is repeated around the circumference of the core and coiled wire so as to provide up to 24 generally diamond-shaped areas about the coil denoted with reference numeral 311. In practice 10 to 14 loops 307 are used.

The generally diamond-shaped pattern referenced above is a lattice structure with two sides 307 of the diamond being the double cord links woven with the elongated single cord segments 308 and 309. The frequency or repetition of the generally diamond-shaped stitching pattern is controlled by the indexing of the lacing machine. FIGS. 3–8 illustrate a lacing pattern created by indexing 12 times or once every 30° around the periphery of the coil. As will be appreciated from FIGS. 6 and 8, the beginning end 309a of the lacing cord and the terminal end 308a thereof are tied to provide a slip knot 305 for releasing the lacing. Preferably, knot 305 is within 0.75 inch of the axial center of the coil. Slip knot 305 enables the easy release of the electrode wire at the point of use. Preferably, a tape flag 306 identifies the location of slip knot 305. Flag 306 is 0.75 inch square and is attached to cord end 308a within one-half inch of the terminal end thereof. A simple pull on the cord end 308a will release the entire lacing as the latter is made up of one continuous cord.

Figure 3:
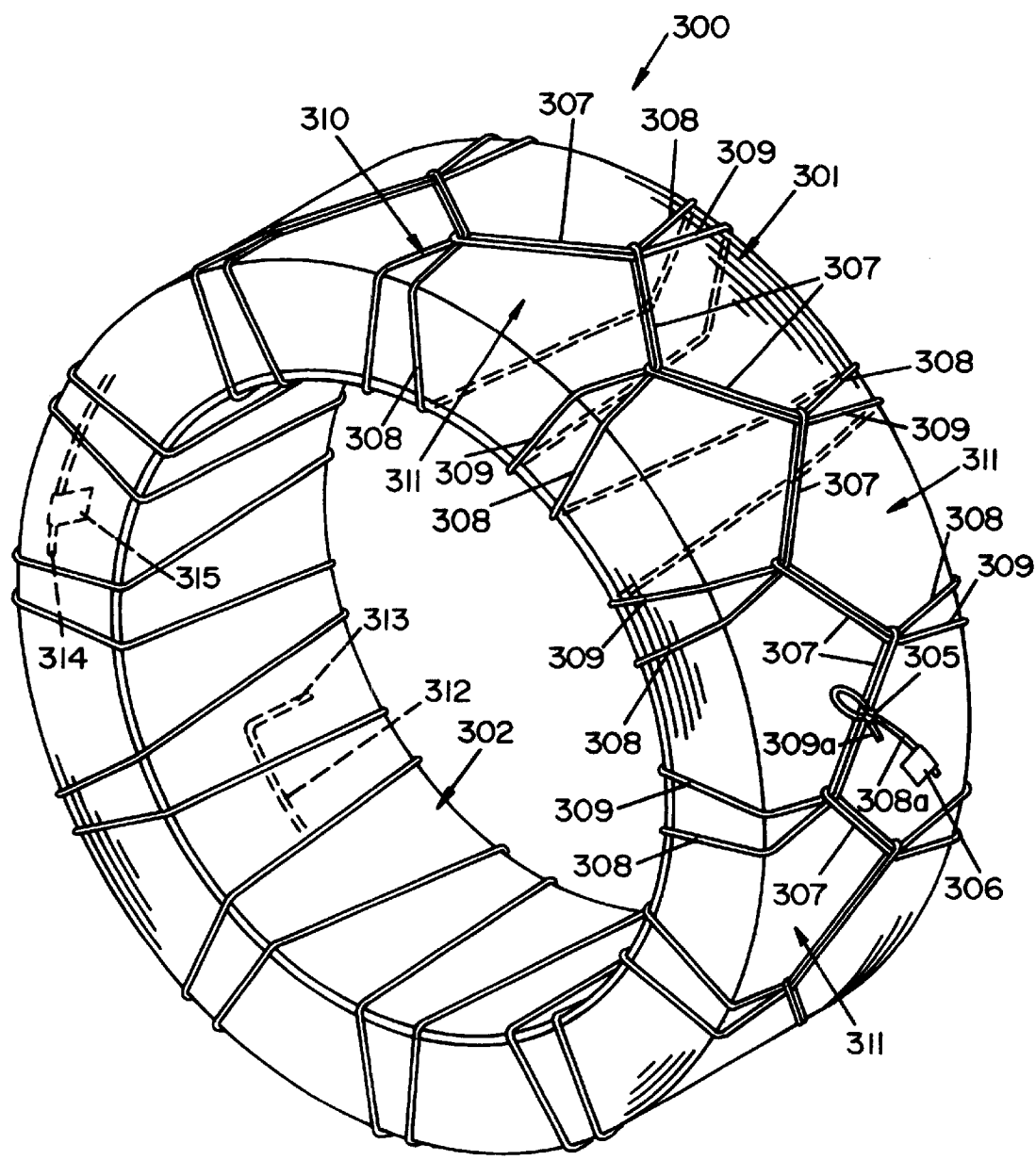
FIG. 3 is a perspective view of an electrode coil according to the invention and illustrating a generally diamond-shaped lacing pattern securing the electrode coil and core.
Figure 4:
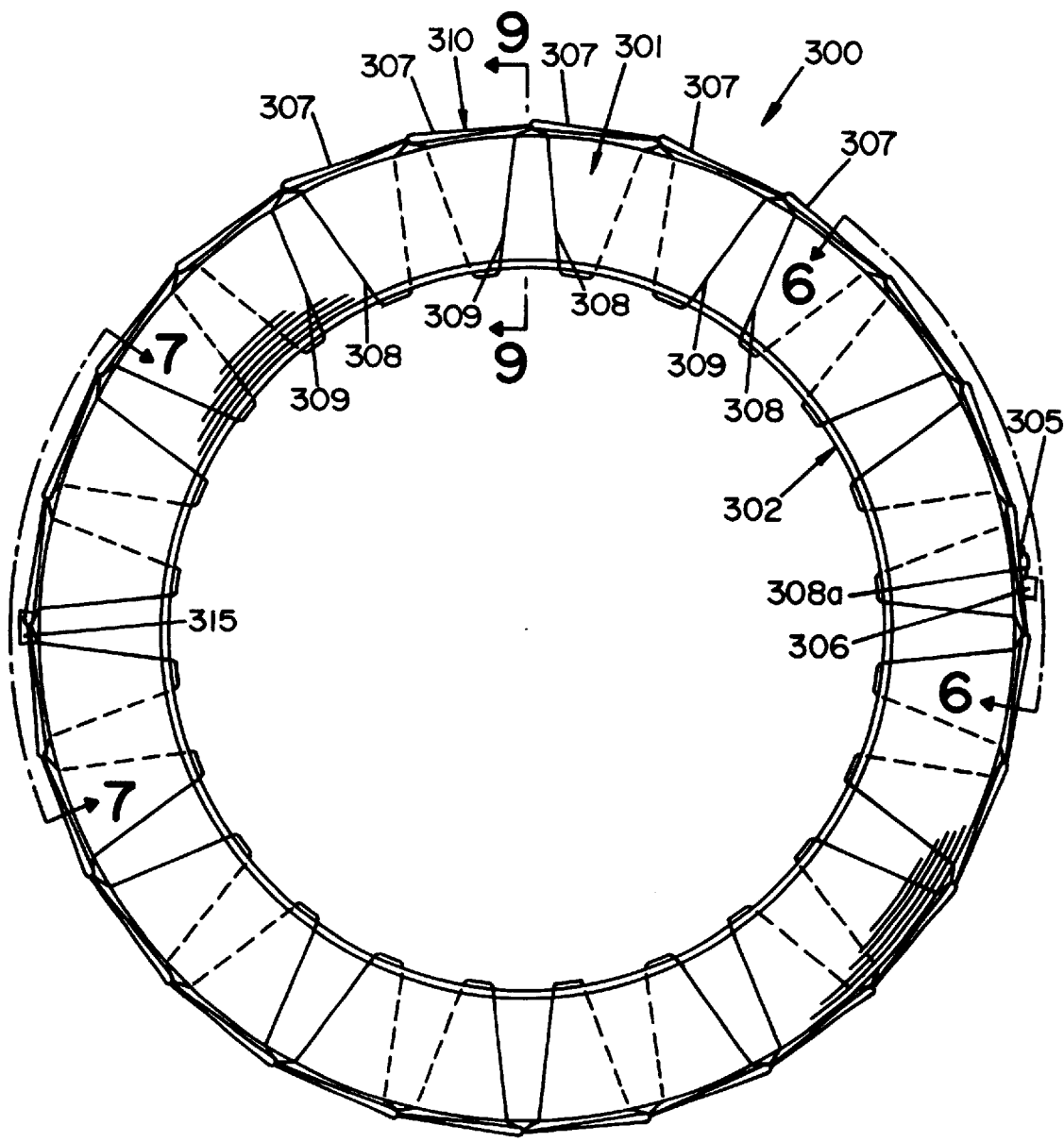
FIG. 4 is a front view of the laced electrode coil and core.
Figure 5:
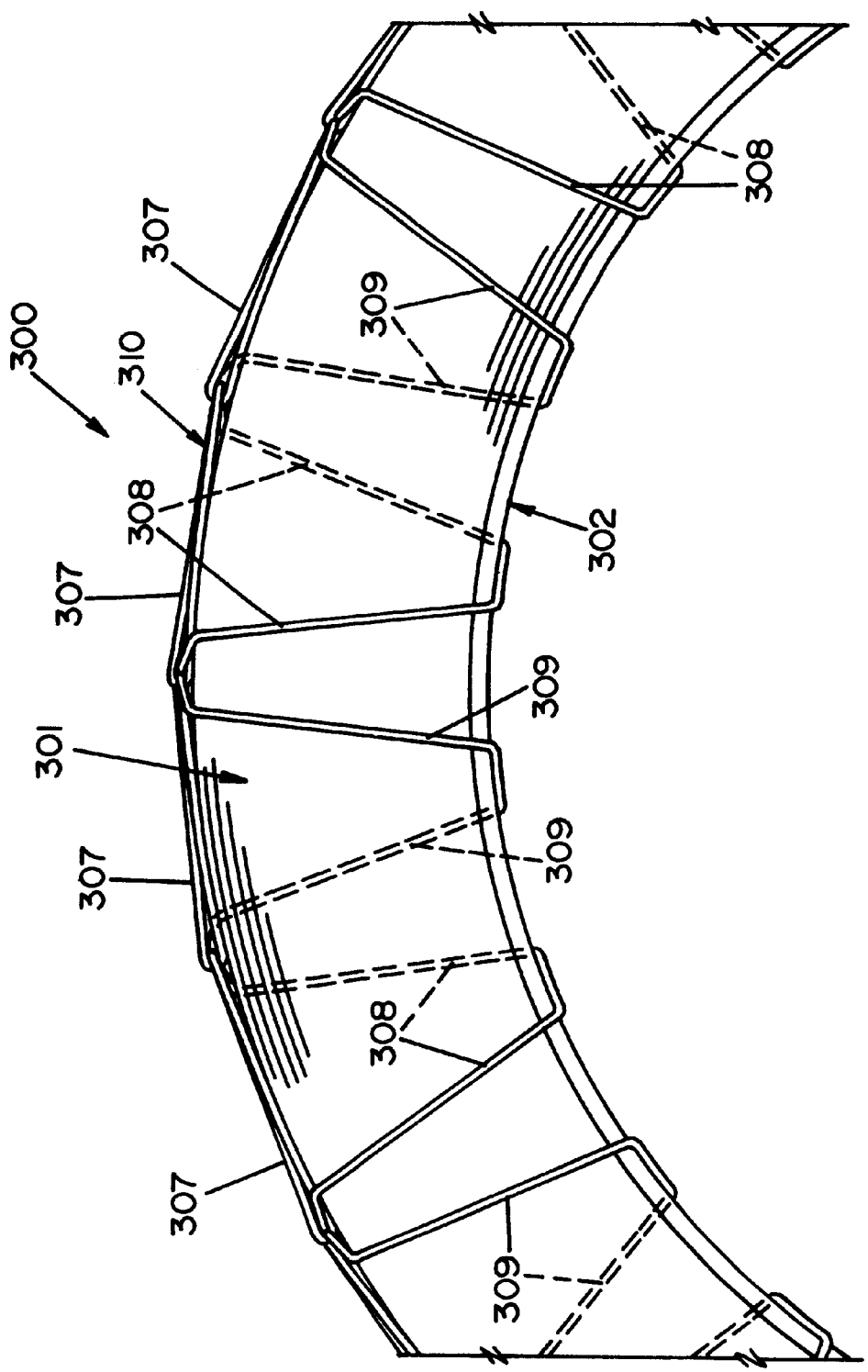
FIG. 5 is an enlarged portion of the coil and core shown in FIG. 4.
Figure 6:
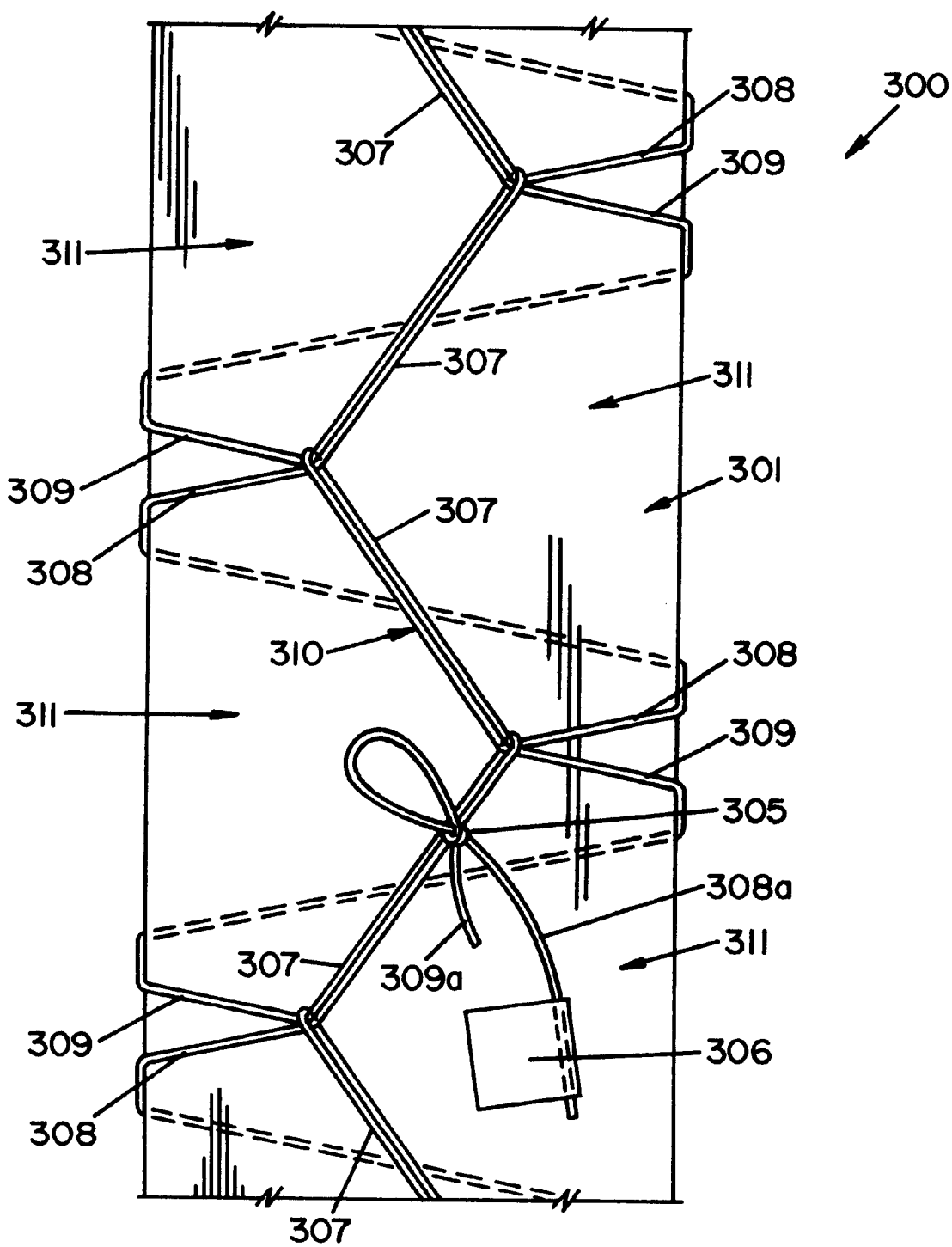
FIG. 6 is a side view of a portion of the bound electrode coil taken along the line 6—6 in FIG. 4.
Figure 7:
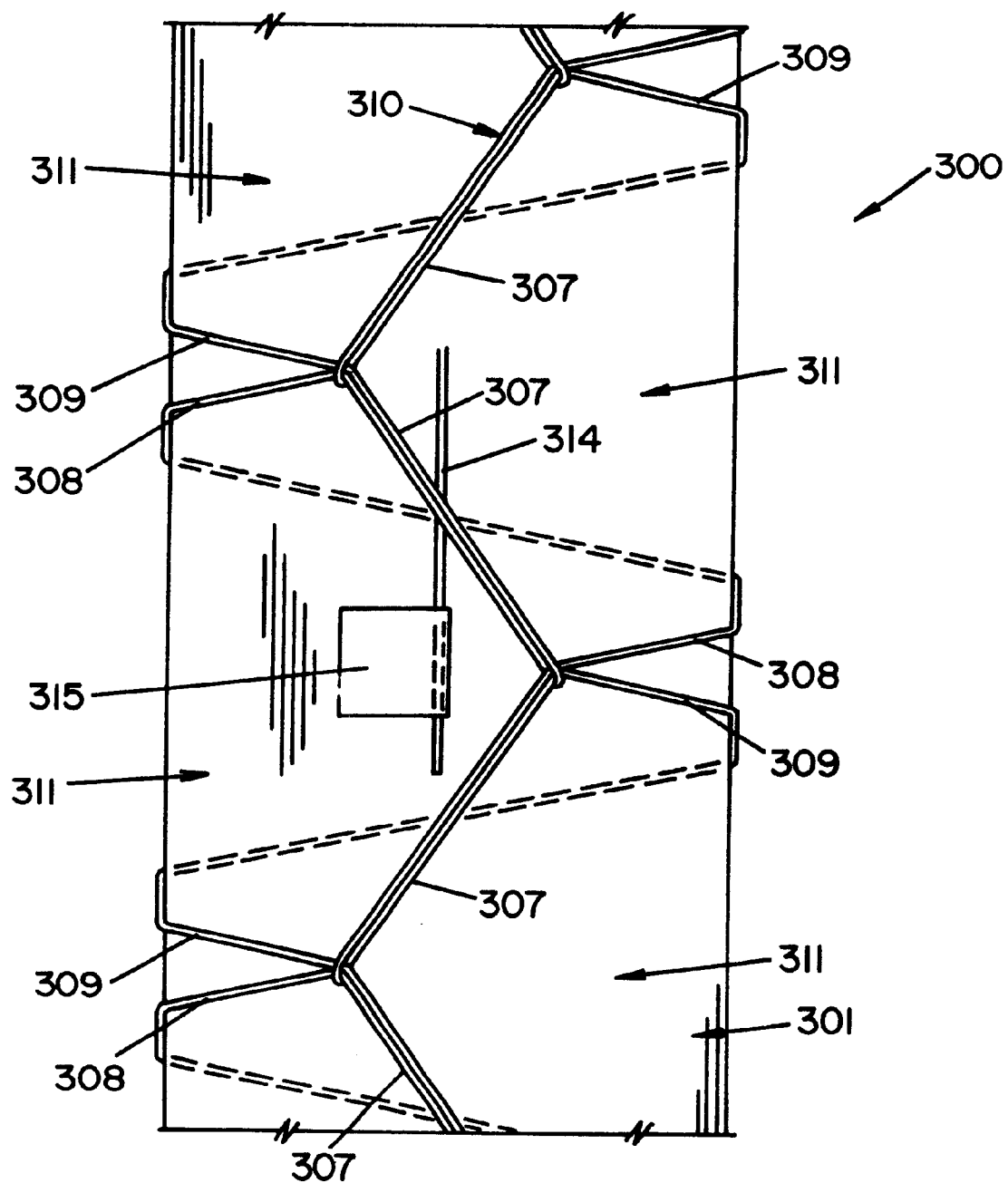
FIG. 7 is a side view of a portion of the bound electrode coil taken along the line 7—7 of FIG. 4.
Figure 8:
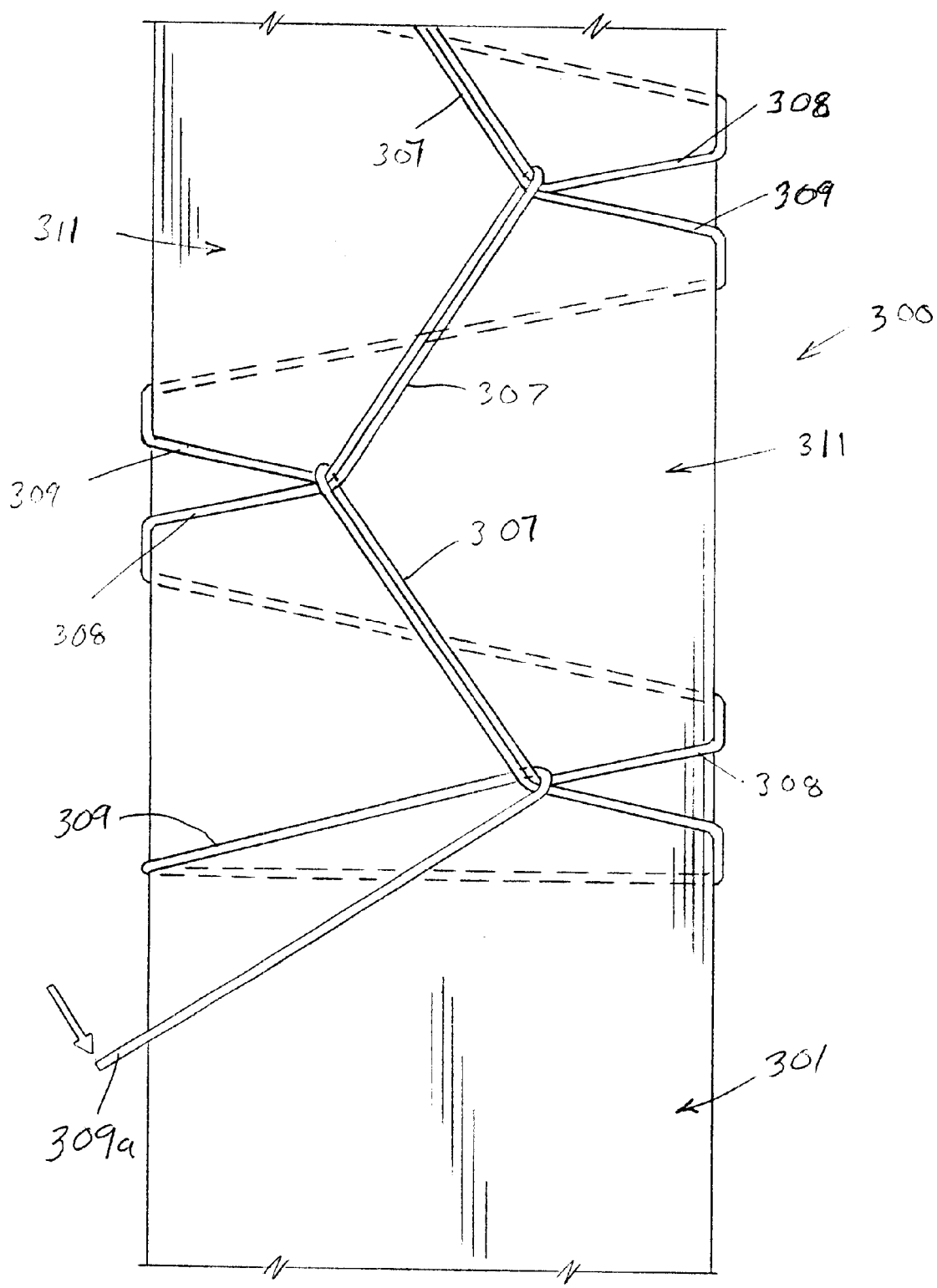
FIG. 8 is an enlarged side view of a portion of an electrode coil illustrating the beginning of the lacing.

As illustrated in FIG. 3, and as described in greater detail hereinafter, inner end 312 of the electrode wire is embedded within the core 302. The terminal end 313 of the inner end of the electrode wire is bent at a 90° angle with respect to the adjacent portion of the inner end. The outer end 314 of the coiled wire is provided with a 0.75 inch square tape flag 315 which is attached to the wire within one-half inch of the terminal end thereof.

Figure 9:
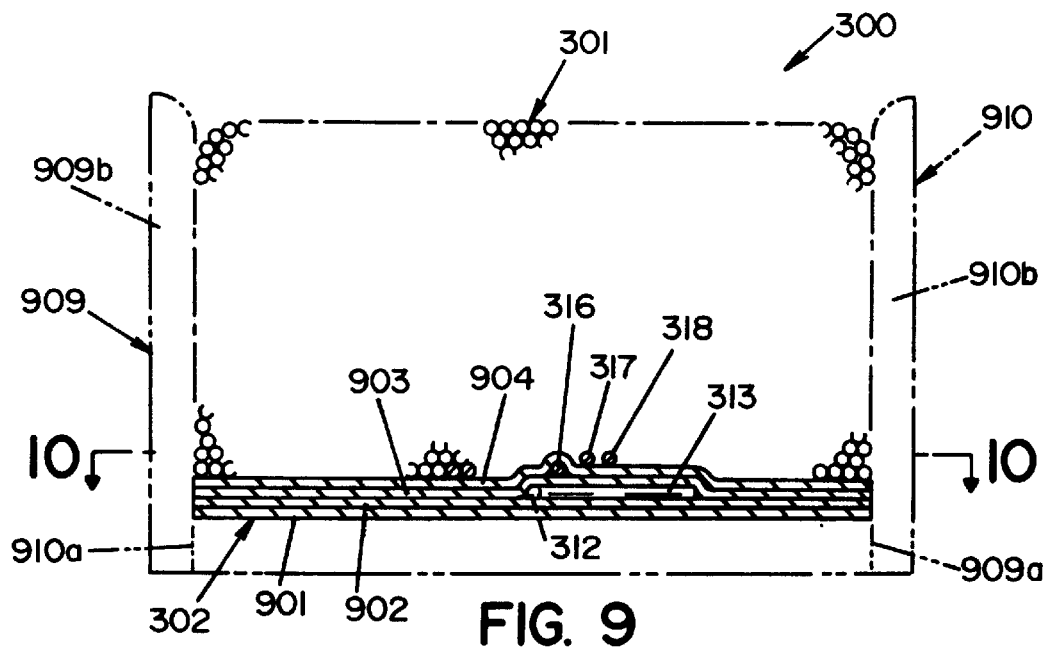
FIG. 9 is a cross-sectional view taken along line 9—9 in FIG. 4, and illustrating the electrode coil wound about a mandrel with the inner end of the wire embedded in the core paper.
Figure 10:
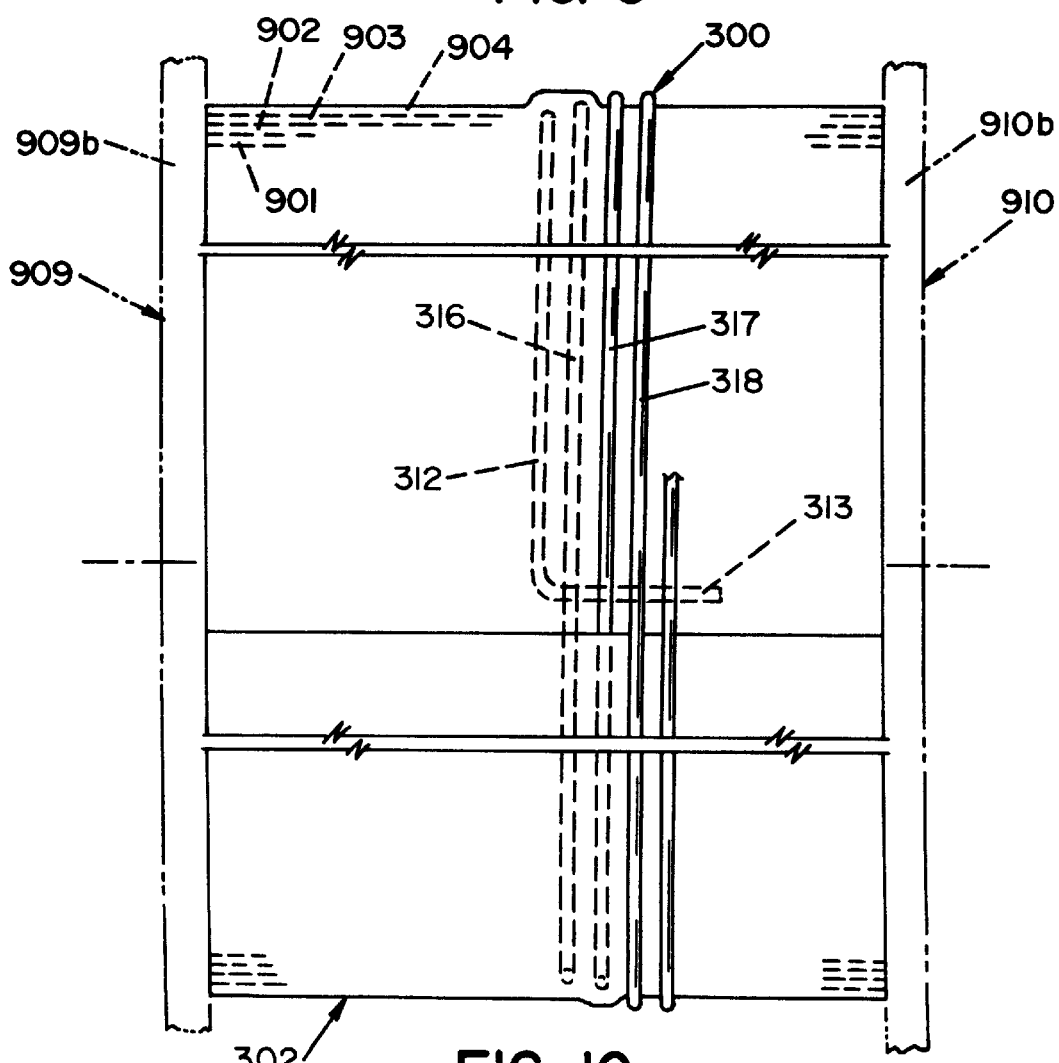
FIG. 10 is a cross-sectional view taken along the lines 10—10 of FIG. 9 and illustrating the inner end and the first two circumferential windings of the electrode wire embedded in the core paper.

FIGS. 9 and 10 illustrate the electrode wire wound about core 302 which is supported on a mandrel and flange assembly comprising a plurality of mandrel and flange plates 909 and 910 having mandrel portion 909a and 910a and a corresponding flange portion 909b and 910b. Core 302 is supported on mandrel portions 909a and 910a and between flange portions 909b and 910b of the assembly during winding. The inner end 312 of the wire is embedded in the core which comprises adhesive coated paper wound about the mandrel. More particularly, the paper has adhesive on the outside thereof such that as it is wound around the mandrel each successive layer after first layer 901 sticks to the prior layer or ply. Reference numeral 902 indicates a second layer of the paper, reference numeral 903 indicates a third layer of the paper and reference numeral 904 indicates the fourth and final layer of the core. As the paper is wound around the mandrel, bent end 313 of inner end 312 of the wire preferably is secured into engagement with the adhesive coated surface on second layer 902. As the electrode wire is wound around layer 902, it is followed by the winding of the third layer 903 of the core, thus entrapping the electrode wire between the paper layers 902 and 903. This process is continued such that a fourth layer 904 of the paper entraps the second circumferentially extending convolutions 316 of the electrode wire. Preferably, the fourth layer completes the core. Reference numerals 317 and 318 represent the third and fourth convolutions of the electrode wire about the paper core 302, and it will be noted that convolutions 316, 317 and 318 overlie wire end 313 to securely hold the end of the wire in the coil core. The number of wraps of paper in the core is dependent on the stiffness required which in turn is dependent in part on the diameter of the wire.

Figure 12:
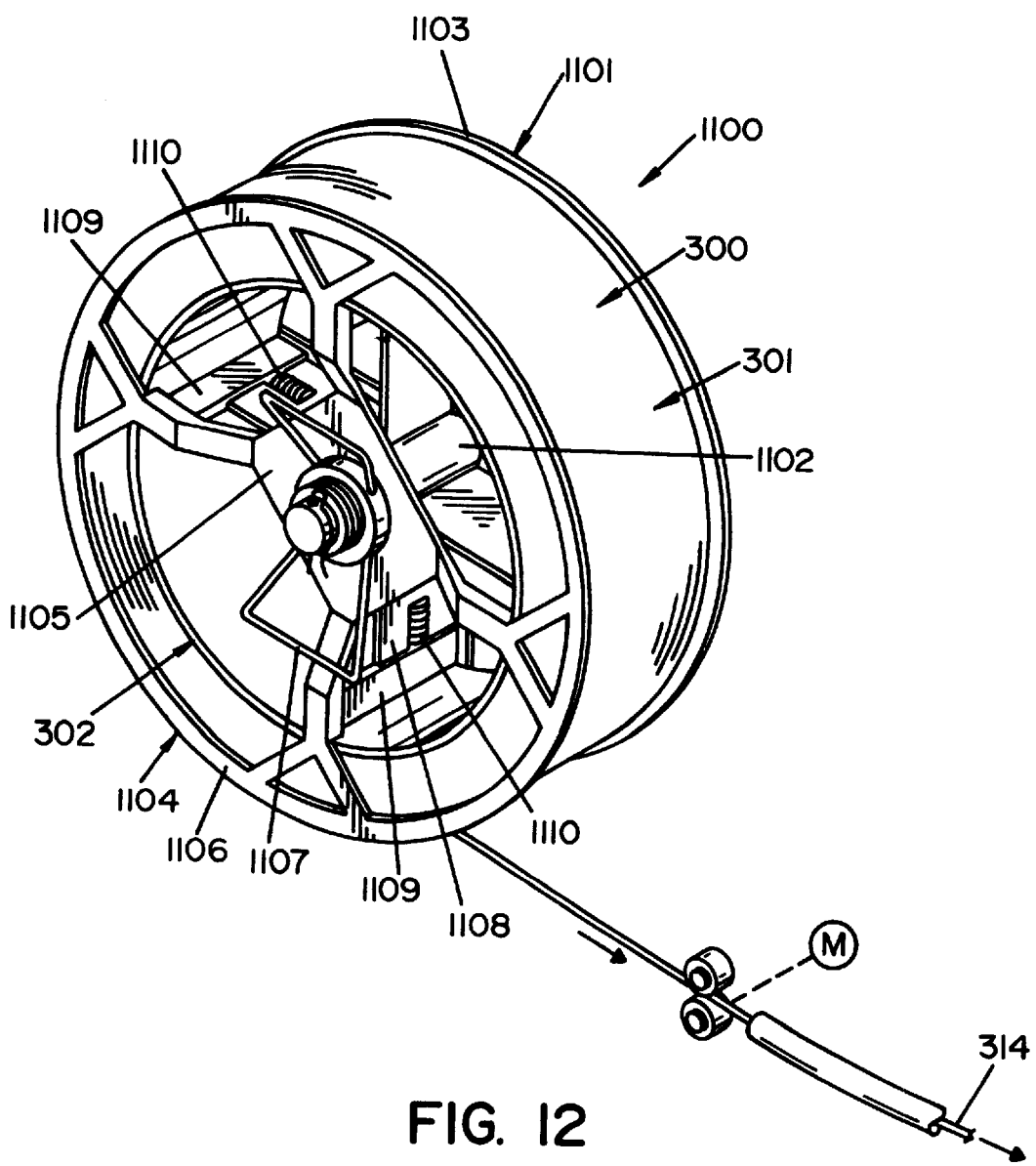
FIG. 12 is a perspective view of the dispenser reel and electrode coil and showing that the lacing has been removed.

FIG. 12 illustrates coil 300 mounted on the dispensing reel illustrated in FIG. 11 and described hereinabove. As will be appreciated from the foregoing description of the laced coil, when the latter has been mounted on reel 1100, and the latter is mounted on welding apparatus, all that is necessary to release the electrode wire for use is to pull end 308a of the cord to untie knot 305. Doing so immediately sequentially releases the lacing cord. Release of the lacing also releases the free or outer end 314 of the electrode wire for feeding to the welding station.

The invention has been described with particularity based on the embodiment shown in the drawings. Those skilled in the art will readily recognize that changes and modifications can be made to the invention without departing from the spirit and scope of the appended claims.

Having thus described the invention, it is so claimed:

1. A core for a wire coil comprising: paper having a first side and a second side, said first side of said paper including an adhesive, and said paper being wound upon itself with said first side facing outwardly to provide a plurality of convolutions in which said adhesive engages each successive convolution in combination with a coil of wire having an inner end and an outer end, and said inner end of said coil being embedded between convolutions of said paper.

2. A core and coil combination according to claim 1, wherein said coil includes multiple windings extending from said inner end, and at least one of said windings being embedded between convolutions of said paper.

3. A core and coil combination according to claim 2, wherein said inner end extends transverse to said multiple windings.

4. A core and coil combination according to claim 3, wherein said multiple windings overlie said inner end.

5. An electrode wire coil comprising a core, an electrode wire coiled about said core, and a cord laced about said coiled wire and said core for releasably retaining said coiled wire on said core, said core comprises paper having an adhesive coat on one side thereof said paper being wound upon itself with the coated side facing outwardly to provide a plurality of convolutions in which said adhesive engages each successive convolution, and said coiled wire includes an inner end and an outer end, and said inner end of said coiled wire is embedded between convolutions of said adhesive coated paper.

6. An electrode wire coil according to claim 5, wherein said coiled wire includes multiple windings extending from said inner end, and at least one of said windings being embedded between convolutions of said paper.

7. An electrode wire coil comprising a core, an electrode wire coiled about said core, and a cord laced about said coiled wire and said core for releasably retaining said coiled wire on said core, said cord is laced about said coiled wire and said core in a diamond stitch lacing pattern.

8. An electrode wire coil according to claim 7, wherein said lacing pattern extends circumferentially about said coiled wire and core.

9. An electrode wire coil according to claim 8, wherein said lacing pattern includes a slip knot for releasing the lacing from said coiled wire and core.

10. An electrode wire coil comprising a core, an electrode wire coiled about said core, and a cord laced about said coiled wire and said core for releasably retaining said coiled wire on said core, said cord laced about said coiled wire and core includes a slip knot for releasing the cord from said coiled wire and core.

11. An electrode wire coil comprising a core, an electrode wire coiled about said core, and a cord laced about said coiled wire and said core for releasably retaining said coiled wire on said core, said core comprises paper having a first and a second side and an adhesive coat on said first side, said paper being wound upon itself with the coated side facing outwardly to provide a plurality of full convolutions in which said adhesive secures said second side of each successive convolution.

\* \* \* \* \*